(12) United States Patent
Bras et al.

(10) Patent No.: US 7,041,156 B2
(45) Date of Patent: May 9, 2006

(54) REMOVING NATURAL GAS LIQUIDS FROM A GASEOUS NATURAL GAS STREAM

(75) Inventors: Eduard Coenraad Bras, The Hague (NL); Paramasivam Senthil Kumar, The Hague (NL)

(73) Assignee: Shell Oil Company, Houston, TX (US)

( * ) Notice: Subject to any disclaimer, the term of this patent is extended or adjusted under 35 U.S.C. 154(b) by 57 days.

(21) Appl. No.: 10/774,741

(22) Filed: Feb. 9, 2004

(65) Prior Publication Data
US 2004/0200353 A1    Oct. 14, 2004

(30) Foreign Application Priority Data
Feb. 10, 2003   (EP) ................................. 03250826

(51) Int. Cl.
*B01D 53/14*   (2006.01)
*F25J 3/06*    (2006.01)

(52) U.S. Cl. .......................... 95/211; 95/229; 95/237; 62/632

(58) Field of Classification Search ................ 95/211, 95/229, 159, 263, 237; 62/618, 632, 635, 62/636
See application file for complete search history.

(56) References Cited

U.S. PATENT DOCUMENTS

| | | | |
|---|---|---|---|
| 4,622,053 A | 11/1986 | Tomlinson et al. | 62/26 |
| 4,881,960 A | 11/1989 | Ranke et al. | 62/20 |
| 4,966,612 A | 10/1990 | Bauer | 62/24 |
| 5,325,673 A | 7/1994 | Durr et al. | 62/23 |
| 5,782,958 A * | 7/1998 | Rojey et al. | 95/192 |
| 5,904,908 A * | 5/1999 | Suzuki et al. | 423/228 |
| 2002/0157538 A1* | 10/2002 | Foglietta et al. | 95/237 |

FOREIGN PATENT DOCUMENTS

| | | |
|---|---|---|
| EP | 0299157 A2 | 4/1988 |
| EP | 0612968 A1 | 2/1994 |

OTHER PUBLICATIONS

PCT International Search Report, International Application No. PCT/EP2004/050102, filed Feb. 9, 2004.
European Search Report dated Jul. 24, 2003.
PCT International Preliminary Report on Patentability. International Application No. PCT/EP2004/050102, filed Feb. 9, 2004.

* cited by examiner

Primary Examiner—Frank M. Lawrence

(57) ABSTRACT

Process for removing natural gas liquids from a gaseous natural gas stream at elevated pressure to obtain a gaseous product stream having a reduced content of natural gas liquids is provided.

32 Claims, 2 Drawing Sheets

REMOVING NATURAL GAS LIQUIDS FROM A GASEOUS NATURAL GAS STREAM

The present invention relates to removing natural gas liquids from a gaseous natural gas stream.

BACKGROUND OF THE INVENTION

U.S. Pat. No. 5,325,673 publication describes a method of pre-treating a natural gas stream for liquefaction by removing heavier hydrocarbons from it, comprising the steps of:
a) introducing a natural gas feed stream into a scrub column having upper enriching and lower stripping sections;
b) contacting the feed stream with a liquid reflux stream introduced into the upper enriching section of the column to absorb $C_5^+$ hydrocarbons from the feed stream;
c) recovering an overhead vapour product containing $C_2$–$C_4$ hydrocarbons and having a concentration of less than about 1 ppm $C_6^+$ hydrocarbons;
d) reboiling a portion of liquid in the lower section of the column to strip lighter hydrocarbons from the feed stream;
e) recovering a liquid bottom product enriched in C5+ hydrocarbons; and
f) operating the column to obtain the $C_2$–$C_4$ hydrocarbons primarily in the overhead product.

The process is directed to obtaining an overhead product that has a very low concentration of $C_6^+$ hydrocarbons. However, the overhead product still contains considerable amounts of ethane, propane and butanes.

SUMMARY OF THE INVENTION

A method of removing natural gas liquids from a gaseous natural gas stream at elevated pressure to produce a gaseous product stream having a reduced content of natural gas liquids is provided, which method comprises the steps of:
(a) cooling the natural gas stream;
(b) introducing said cooled natural gas stream into the bottom of a scrub column that has a lower stripping section and an upper absorption section, each section containing at least one theoretical stage;
(c) allowing natural gas to rise through the scrub column, and removing from the top of the scrub column an overhead stream;
(d) partly condensing the overhead stream, and separating said partly condensed overhead stream into a gaseous stream having a reduced content of natural gas-liquids and a liquid reflux stream, and removing the gaseous stream as the gaseous product stream having a reduced content of natural gas liquids;
(e) splitting the liquid reflux stream into a first reflux stream and a second reflux stream;
(f) introducing the first reflux stream into the top of the absorption section of the scrub column;
(g) introducing the second reflux stream into the top of the stripping section to strip the desired light gaseous components; and
(h) removing from the bottom of the scrub column a liquid bottom stream rich in heavier components.

DETAILED DESCRIPTION OF THE INVENTION

Figure 1:
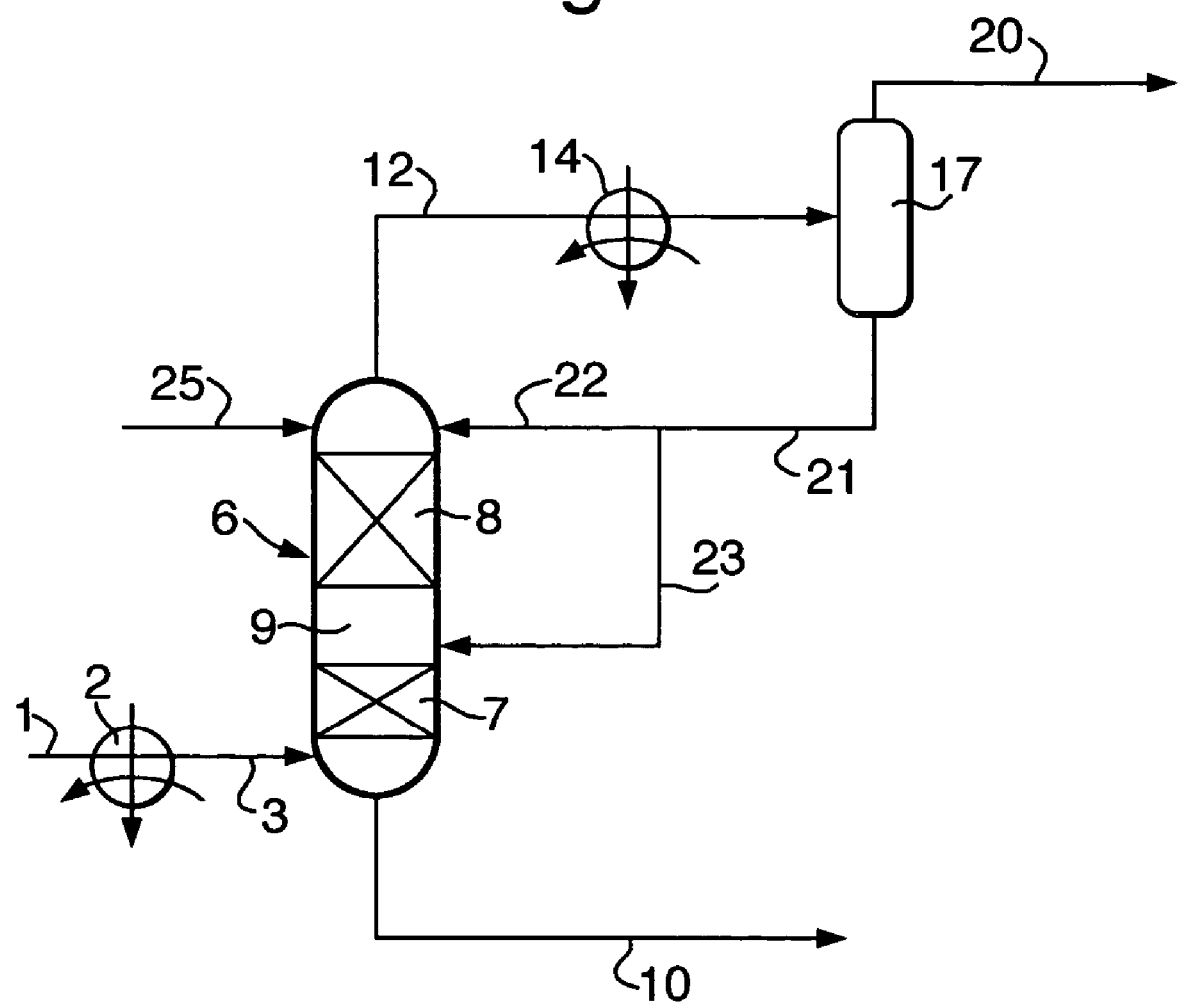
FIG. 1 is a schematic flow scheme of one embodiment of the present invention.

In the specification and the claims the term natural gas liquids is used to refer to heavier hydrocarbons, such as liquefied petroleum gas components and natural gasolines.

The natural gas liquids are removed, because they have an economic value and because removing the natural gas liquids reduces the heating value of the natural gas stream.

By way of example we give a molar composition of a natural gas stream from which the natural gas liquids are to be removed: methane 86 mol %, ethane 6 mol %, propane 4 mol %, butane plus 1 mol %, and the balance is formed by other components, such nitrogen, carbon dioxide and helium.

The present invention relates in one aspect to removing such natural gas liquids from a natural gas stream at elevated pressure, for example at pressures greater than 3 MPa (absolute) and less than the critical pressure of the natural gas, which is about 7 MPa (absolute).

A method for removing natural gas liquids from a gaseous natural gas stream is provided wherein high-pressure separation is obtained, which has a high propane recovery and a high rejection of methane and ethane. Moreover the process provides a method of removing natural gas liquids in which no reboiler is needed.

To this end the method of removing natural gas liquids from a gaseous natural gas stream at elevated pressure to obtain a gaseous product stream having a reduced content of natural gas liquids compared to the gaseous natural gas stream is provided comprising the steps of:
(a) cooling the natural gas stream;
(b) introducing the cooled natural gas stream into the bottom of a scrub column that has a lower stripping section and an upper absorption section, each section containing at least one theoretical stage;
(c) allowing natural gas to rise through the scrub column, and removing from the top of the scrub column an overhead stream;
(d) partly condensing the overhead stream, and separating the partly condensed overhead stream into a gaseous stream having a reduced content of natural gas liquids and a liquid reflux stream, and removing the gaseous stream as the gaseous product stream having a reduced content of natural gas liquids;
(e) splitting the liquid reflux stream into a first reflux stream and a second reflux stream;
(f) introducing the first reflux stream into the top of the absorption section of the scrub column;
(g) introducing the second reflux stream into the top of the stripping section to strip the desired light gaseous components; and
(h) removing from the bottom of the scrub column a liquid bottom stream rich in heavier components.

Suitably the method according to the present invention further comprises introducing hydrocarbon liquid into the top of the absorption section.

The invention will now be described by way of example in more detail with reference to the accompanying drawings.

Process for removing natural gas liquids from a gaseous natural gas stream at elevated pressure to obtain a gaseous product stream having a reduced content of natural gas liquids is provided:
(a) introducing cooled natural gas (3) into a scrub column (6) that consists of a lower stripping section (7) and an upper absorption section (8);

(b) removing from the scrub column an overhead stream (12);
(c) partly condensing (14) the overhead stream (12), and separating (17) the partly condensed overhead stream into a gaseous product stream (20) and a liquid reflux stream (21);
(d) splitting the liquid reflux stream (21) into a first reflux stream (22) and a second reflux stream (23);
(e) introducing the first reflux stream (22) into the top of the absorption section (8) of the scrub column (6); and
(f) introducing the second reflux stream (23) into the top of the stripping section (7), and removing from the bottom of the scrub column (6) a liquid bottom stream (10) rich in heavier components.

Reference is first made to FIG. 1. A gaseous natural gas stream including natural gas liquids ($C_2$–$C_4$ hydrocarbons and $C_5^+$ hydrocarbons), which is essentially free from acid gases, is supplied via conduit 1 to a heat exchanger 2 in which the stream is partly condensed. Partly condensed natural gas is supplied through conduit 3 into the bottom of a scrub column 6. The pressure of the natural gas entering into the scrub column is between 3 and about 7 MPa (absolute), and the temperature is between 0 and −20° C.

The scrub column 6 operates at the pressure at which the natural gas is supplied. The scrub column 6 comprises two sections, a lower stripping section 7 and an upper absorption section 8 separated from the stripping section 7 by an interval 9. The stripping section 7 comprises between 1 and 4 theoretical separation stages and the absorption section 8 comprises between 4 and 10 theoretical stages. The theoretical separation stages can be provided by contacting trays or by a suitable packing material.

The gaseous fraction of the natural gas stream is allowed to rise in the scrub column 6 through the stripping section 7 and the absorption section 8. The liquid fraction of the natural gas stream is removed from the scrub column 6 through a conduit 10.

From the top of the scrub column 6 an overhead stream is removed through conduit 12, which overhead stream has a reduced content of natural gas liquids. The overhead stream is partly condensed in heat exchanger 14, and separated in separation vessel 17 into a liquid stream and a gaseous product stream. The gaseous product stream is removed from the separation vessel 17 through conduit 20 and passed to a plant for liquefying the gaseous product stream (not shown). The liquid stream is removed through conduit 21. The temperature of the partly condensed overhead stream is in the range of from −25 to −65° C., and the amount of liquid in the partly condensed overhead stream is between 10 and 35 mol % based on the total overhead stream. Suitably the gaseous product stream removed through conduit 20 is supplied (not shown) to the heat exchanger 14 to provide the cold for partly condensing the overhead stream, before the gaseous product is transported away.

Part of the liquid stream is introduced through conduit 22 as a first reflux stream into the top of the scrub column 6 above the absorption section 8 as an absorbent. The liquid is brought in the absorption section 8 in counter-current contact with the gas from the stripping section 7. Components heavier than methane are removed from the gas by the first reflux stream acting as an absorbent.

The remainder of the liquid stream is introduced through conduit 23 as a second reflux stream into the scrub column 6 in the interval 9 above the stripping section 7. In the stripping section 7, the second reflux stream and the liquid descending from the absorption section 8 are brought into counter-current contact with the rising gaseous fraction of the natural gas stream. The gaseous fraction strips the light components (methane and ethane) from the liquid stream. The liquid stream having a low concentration of light components is then removed from the bottom of the scrub column 6 through conduit 10.

Suitably, the amount of second reflux stream in the conduit 23 is between 10 and 95% by mass of the liquid stream that is removed from the separator vessel 17.

In addition hydrocarbon liquid can be introduced into the top of the absorption section 8 through conduit 25. A suitable hydrocarbon liquid is butane. The amount of this additional absorbent is suitably between 1 and 4 times the amount of liquid supplied through conduit 22. The additional absorbent suitably consists of butane plus components.

Figure 2:
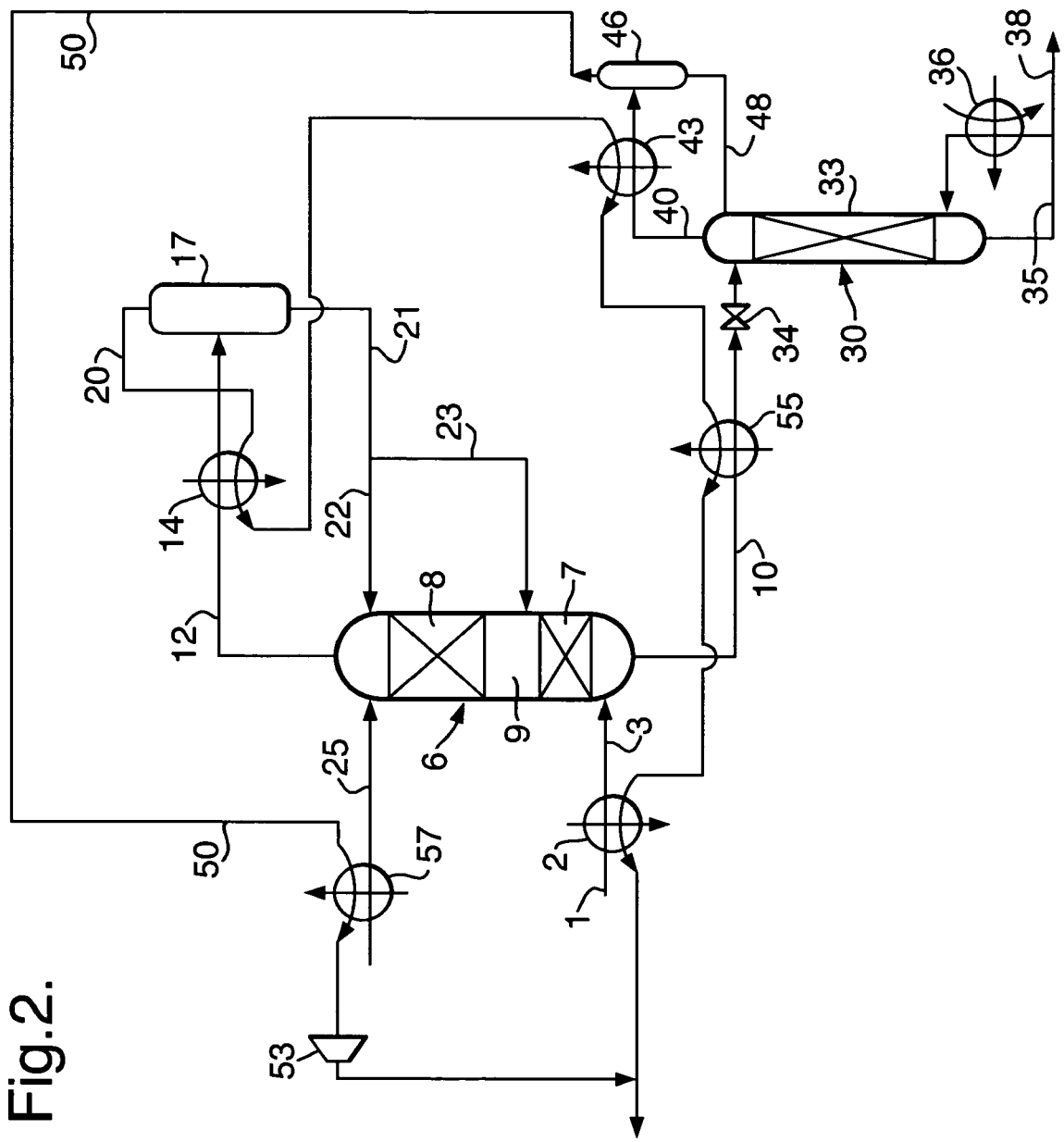
FIG. 2 is a schematic flow scheme of another embodiment of the present invention.

Reference is now made to FIG. 2. Please note that parts that were discussed with reference to FIG. 1 have been given the same reference numerals, and they will not be discussed here. The liquid bottom stream removed through conduit 10 is introduced into the top of a stripping column 30 to strip gaseous components, such as methane and ethane, from the liquid bottom stream. The stripping column 30 has a stripping section 33 including at least one theoretical separation stage. Suitably the stripping section 33 includes 2–10 theoretical separation stages. The pressure in the stripping column 30 is in the range of 2–3.5 MPa (absolute). To allow reduction of the pressure of the liquid bottom stream, the conduit 10 includes a pressure reduction valve 34.

From the bottom of the stripping column 30 a liquid stream is removed through conduit 35. Part of the liquid bottom stream is vaporised in reboiler 36 and the resulting vapour is introduced into the bottom of the stripping column 30. The remainder is passed away through conduit 38 to storage (not shown) or to a further treatment (not shown).

From the top of the stripping column 30 a gaseous overhead stream is removed through conduit 40. The gaseous overhead stream is partly condensed in heat exchanger 43 to obtain a partly condensed gaseous overhead stream. The partly condensed overhead stream is separated in separator 46 into a liquid fraction and a gaseous fraction. The liquid fraction is removed through conduit 48 and introduced into the top of the stripping column 30 as reflux. The gaseous fraction is removed through conduit 50 and added to the gaseous product stream. Optionally the pressure of the gaseous overhead fraction is increased to the pressure of the gaseous product stream using compressor 53.

Suitably at least part of the gaseous product stream removed through conduit 20 is supplied to heat exchanger 14 to provide the cold for partly condensing the overhead stream 12.

Suitably the gaseous overhead is partly condensed by indirect heat exchange with the gaseous product stream supplied to the heat exchanger 43 through conduit 20.

Suitably the liquid bottom stream removed from the scrub column 6 through conduit 10 is cooled by indirect exchange in heat exchanger 55 with the gaseous product stream.

In heat exchanger 2 the natural gas stream in conduit 1 is partly condensed, and suitably this is done by indirect heat exchange with the gaseous product stream.

Suitably the hydrocarbon liquid supplied to the top of the scrub column 6 is cooled in heat exchanger 57 by indirect heat exchange with the gaseous overhead fraction.

The invention will now be described by way of example with reference to three calculated examples. In the first example, not according to the present invention, only the reflux through conduit 22 is supplied to the top of the scrub column 6. In the second example, according to the present invention, reflux is supplied through conduits 22 and 23; and in the third example, according to the present invention, additional hydrocarbon liquid is supplied through conduit 25. The conditions for each example have been so selected as to maximize the recovery of natural gas liquids.

In the examples, the scrub column contains eight theoretical separation stages. In the two examples according to the present invention, the stripping section 7 contains two theoretical separation stages and the absorption section 8 contains six theoretical separation stages.

The results are summarized in the below Tables 1–8.

In the tables the molar flow rates are in kmol/s, the mass flow rates are in kg/s, the temperatures are in ° C., the pressures are in MPa (absolute), and the molar composition is in mol %. The butane plus components are butane, iso-butane, pentane, iso-pentane, hexane and heptane. The other components mentioned in the composition are water, nitrogen, hydrogen sulphide, carbon dioxide and helium.

TABLE 1

Data on partly condensed feed supplied through conduit 3.

| Stream 3 | Example 1, Not according to the invention | Example 2, According to the invention | Example 3, According to the invention |
|---|---|---|---|
| Molar flow rate | 7.90 | 7.55 | 7.73 |
| Mass flow rate | 155 | 142 | 145 |
| Temperature | 0 | −5 | −5 |
| Pressure | 5.6 | 5.8 | 6.0 |
| Molar composition | | | |
| Methane | 0.862 | 0.882 | 0.882 |
| Ethane | 0.064 | 0.062 | 0.062 |
| Propane | 0.042 | 0.036 | 0.036 |
| Butane plus | 0.031 | 0.019 | 0.019 |
| Other components | Balance | Balance | Balance |

TABLE 2

Data on overhead stream removed from top of the scrub column through conduit 12. Please note that the flow rates are larger than the flow rates in conduit 3, because of the internal recycle.

| Stream 12 | Example 1, Not according to the invention | Example 2, According to the invention | Example 3, According to the invention |
|---|---|---|---|
| Molar flow rate | 8.79 | 8.64 | 8.39 |
| Mass flow rate | 168 | 161 | 152 |
| Temperature | −19 | −23 | −18 |
| Pressure | 5.6 | 5.6 | 6.0 |
| Molar composition | | | |
| Methane | 0.852 | 0.871 | 0.897 |
| Ethane | 0.080 | 0.078 | 0.070 |
| Propane | 0.064 | 0.043 | 0.022 |
| Butane plus | 0.003 | 0.006 | 0.001 |
| Other components | Balance | Balance | Balance |

TABLE 3

Data on reflux supplied through conduit 22 to top of the scrub column 6.

| Stream 22 | Example 1, Not according to the invention | Example 2, According to the invention | Example 3, According to the invention |
|---|---|---|---|
| Molar flow rate | 1.57 | 0.17 | 0.08 |
| Mass flow rate | 40.5 | 4.05 | 1.81 |
| Temperature | −43 | −48 | −54 |
| Pressure | 5.6 | 5.8 | 6.0 |
| Molar composition | | | |
| Methane | 0.571 | 0.650 | 0.720 |
| Ethane | 0.176 | 0.170 | 0.155 |
| Propane | 0.241 | 0.152 | 0.078 |
| Butane plus | 0.001 | 0.027 | 0.005 |
| Other components | Balance | Balance | Balance |

TABLE 4

Data on reflux supplied through conduit 23 to top of the stripping section 7 in the scrub column 6.

| Stream 23 | Example 1, Not according to the invention | Example 2, According to the invention | Example 3, According to the invention |
|---|---|---|---|
| Molar flow rate | Not applicable | 1.54 | 1.46 |
| Mass flow rate | Not applicable | 3.68 | 3.31 |
| Temperature | Not applicable | −48 | −54 |
| Pressure | Not applicable | 5.8 | 6.0 |
| Molar composition | | | |
| Methane | Not applicable | 0.650 | 0.720 |
| Ethane | Not applicable | 0.170 | 0.155 |
| Propane | Not applicable | 0.152 | 0.078 |
| Butane plus | Not applicable | 0.027 | 0.005 |
| Other components | Not applicable | Balance | Balance |

TABLE 5

Data on hydrocarbon liquid supplied through conduit 25 to top of the scrub column 6.

| Stream 25 | Example 1, Not according to the invention | Example 2, According to the invention | Example 3, According to the invention |
|---|---|---|---|
| Molar flow rate | Not applicable | Not applicable | 0.12 |
| Mass flow rate | Not applicable | Not applicable | 7.9 |

TABLE 5-continued

Data on hydrocarbon liquid supplied through conduit 25 to top of the scrub column 6.

| Stream 25 | Example 1, Not according to the invention | Example 2, According to the invention | Example 3, According to the invention |
|---|---|---|---|
| Temperature | Not applicable | Not applicable | −33 |
| Pressure | Not applicable | Not applicable | 6.0 |
| Molar composition | | | |
| Methane | Not applicable | Not applicable | 0.00 |
| Ethane | Not applicable | Not applicable | 0.00 |
| Propane | Not applicable | Not applicable | 0.00 |
| Butane plus | Not applicable | Not applicable | 1.00 |
| Other components | Not applicable | Not applicable | 0.00 |

TABLE 6

Data on the gaseous product stream removed through conduit 20.

| Stream 20 | Example 1, Not according to the invention | Example 2, According to the invention | Example 3, According to the invention |
|---|---|---|---|
| Molar flow rate | 7.196 | 6.927 | 6.852 |
| Mass flow rate | 128 | 120 | 109 |
| Temperature | −43 | −49 | −54 |
| Pressure | 5.3 | 5.5 | 5.7 |
| Molar composition | | | |
| Methane | 0.913 | 0.925 | 0.937 |
| Ethane | 0.059 | 0.055 | 0.051 |
| Propane | 0.026 | 0.017 | 0.009 |
| Butane plus | 0.0009 | 0.0011 | 0.0015 |
| Other components | Balance | Balance | Balance |

TABLE 7

Data on liquid fraction of the feed gas that is removed from the bottom of the scrub column 6 through conduit 10.

| Stream 10 | Example 1, Not according to the invention | Example 2, According to the invention | Example 3, According to the invention |
|---|---|---|---|
| Molar flow rate | 0.70 | 0.63 | 0.99 |
| Mass flow rate | 27 | 22 | 36 |
| Temperature | −2 | −11 | −10 |
| Pressure | 5.6 | 5.8 | 6.0 |

TABLE 7-continued

Data on liquid fraction of the feed gas that is removed from the bottom of the scrub column 6 through conduit 10.

| Stream 10 | Example 1, Not according to the invention | Example 2, According to the invention | Example 3, According to the invention |
|---|---|---|---|
| Molar composition | | | |
| Methane | 0.343 | 0.401 | 0.401 |
| Ethane | 0.108 | 0.133 | 0.133 |
| Propane | 0.208 | 0.255 | 0.218 |
| Butane plus | 0.341 | 0.210 | 0.247 |
| Other components | Balance | Balance | Balance |

The results can be summarized in Table 8 by comparing the content of hydrocarbons in the liquid stream that is removed from the bottom of the scrub column 6 through conduit 10.

TABLE 8

Composition of the liquid stream removed through conduit 10, in percent of the composition of the feed supplied through conduit 1 (taking into account the absorption liquid supplied through conduit 25 in the last example).

| Stream 10 | Example 1, Not according to the invention | Example 2, According to the invention | Example 3, According to the invention |
|---|---|---|---|
| Methane | 3.5 | 3.8 | 5.8 |
| Ethane | 15 | 18 | 27 |
| Propane | 44 | 59 | 78 |
| Butane plus | 97 | 93 | 94 |

The above results illustrate the advantageous effect on the recovery of natural gas liquids of separating the reflux stream into two reflux streams, a first reflux stream being supplied to the top of the scrub column 6 and a second reflux stream being supplied to the top of the stripping section 7.

The method according to the present invention can be used to remove heavier components from natural gas that is after processing introduced into a pipeline through which the gas is transported to the user.

However, suitably the method according to the present invention is used to remove heavier components from natural gas that is after processing supplied to a plant for liquefying natural gas.

We claim:

1. A method of removing natural gas liquids from a gaseous natural gas stream at elevated pressure to produce a gaseous product stream having a reduced content of natural gas liquids, which method comprises the steps of:
   (a) cooling the natural gas stream;
   (b) introducing said cooled natural gas stream into the bottom of a scrub column that has a lower stripping section and an upper absorption section, each section containing at least one theoretical stage;
   (c) allowing natural gas to rise through the scrub column, and removing from the top of the scrub column an overhead stream;

(d) partly condensing the overhead stream, and separating said partly condensed overhead stream into a gaseous stream having a reduced content of natural gas liquids and a liquid reflux stream, and removing the gaseous stream as the gaseous product stream having a reduced content of natural gas liquids;

(e) splitting the liquid reflux stream into a first reflux stream and a second reflux stream;

(f) introducing the first reflux stream into the top of the absorption section of the scrub column;

(g) introducing the second reflux stream into the top of the stripping section to strip the desired light gaseous components; and (h) removing from the bottom of the scrub column a liquid bottom stream rich in heavier components.

2. The method of claim 1 wherein partly condensing the overhead stream in step (d) is cooled by indirect heat exchange with at least part of the gaseous product stream.

3. The method of claim 1 further comprising introducing the liquid bottom stream at a lower pressure in the top of a stripping column having at least one theoretical separation stage; removing from the bottom of the stripping column a liquid stream of which a part is vaporized, which part is introduced into the bottom of the stripping column; removing from the top of the stripping column a gaseous overhead stream; partly condensing the gaseous overhead stream and separating the partly condensed overhead stream into a liquid fraction and a gaseous fraction; introducing the liquid fraction into the top of the stripping column; and adding the gaseous overhead fraction to the gaseous product stream.

4. The method of claim 3 wherein partly condensing the overhead stream in step (d) is cooled by indirect heat exchange with at least part of the gaseous product stream.

5. The method of claim 3 wherein the gaseous overhead is partly condensed by indirect heat exchange with the gaseous product stream.

6. The method of claim 4 wherein the gaseous overhead is partly condensed by indirect heat exchange with the gaseous product stream.

7. The method of claim 3 wherein the liquid bottom stream from the scrub column is cooled by indirect exchange with the gaseous product stream.

8. The method of claim 4 wherein the liquid bottom stream from the scrub column is cooled by indirect exchange with the gaseous product stream.

9. The method of claim 5 wherein the liquid bottom stream from the scrub column is cooled by indirect exchange with the gaseous product stream.

10. The method of claim 6 wherein the liquid bottom stream from the scrub column is cooled by indirect exchange with the gaseous product stream.

11. The method of claim 1 wherein the natural gas stream is partly condensed by indirect heat exchange with the gaseous product stream.

12. The method of claim 2 wherein the natural gas stream is partly condensed by indirect heat exchange with the gaseous product stream.

13. The method of claim 3 wherein the natural gas stream is partly condensed by indirect heat exchange with the gaseous product stream.

14. The method of claim 4 wherein the natural gas stream is partly condensed by indirect heat exchange with the gaseous product stream.

15. The method of claim 5 wherein the natural gas stream is partly condensed by indirect heat exchange with the gaseous product stream.

16. The method of claim 6 wherein the natural gas stream is partly condensed by indirect heat exchange with the gaseous product stream.

17. The method of claim 7 wherein the natural gas stream is partly condensed by indirect heat exchange with the gaseous product stream.

18. The method of claim 8 wherein the natural gas stream is partly condensed by indirect heat exchange with the gaseous product stream.

19. The method of claim 9 wherein the natural gas stream is partly condensed by indirect heat exchange with the gaseous product stream.

20. The method of claim 10 wherein the natural gas stream is partly condensed by indirect heat exchange with the gaseous product stream.

21. The method of claim 1 further comprising introducing hydrocarbon liquid into the top of the absorption section.

22. The method of claim 3 further comprising introducing hydrocarbon liquid into the top of the absorption section.

23. The method of claim 4 further comprising introducing hydrocarbon liquid into the top of the absorption section.

24. The method of claim 5 further comprising introducing hydrocarbon liquid into the top of the absorption section.

25. The method of claim 6 further comprising introducing hydrocarbon liquid into the top of the absorption section.

26. The method of claim 7 further comprising introducing hydrocarbon liquid into the top of the absorption section.

27. The method of claim 11 further comprising introducing hydrocarbon liquid into the top of the absorption section.

28. The method of claim 22 wherein the hydrocarbon liquid is cooled by indirect heat exchange with the gaseous overhead fraction.

29. The method of claim 23 wherein the hydrocarbon liquid is cooled by indirect heat exchange with the gaseous overhead fraction.

30. The method of claim 24 wherein the hydrocarbon liquid is cooled by indirect heat exchange with the gaseous overhead fraction.

31. The method of claim 25 wherein the hydrocarbon liquid is cooled by indirect heat exchange with the gaseous overhead fraction.

32. The method of claim 26 wherein the hydrocarbon liquid is cooled by indirect heat exchange with the gaseous overhead fraction.

* * * * *